US012790222B2

(12) United States Patent
Dixit et al.

(10) Patent No.: US 12,790,222 B2
(45) Date of Patent: Nov. 10, 2026

(54) METHOD FOR PRODUCING ANODE GRADE COKE FROM CRUDE OILS

(71) Applicant: INDIAN OIL CORPORATION LIMITED, Mumbai (IN)

(72) Inventors: Shivam Ashok Dixit, Faridabad (IN); Terapalli Hari Venkata Devi Prasad, Faridabad (IN); Ponoly Ramachandran Pradeep, Faridabad (IN); Rajesh, Faridabad (IN); Satyen Kumar Das, Faridabad (IN); Madhusudan Sau, Faridabad (IN); Gurpreet Singh Kapur, Faridabad (IN); Sankara Sri Venkata Ramakumar, Faridabad (IN)

(73) Assignee: INDIAN OIL CORPORATION LIMITED (IN)

( * ) Notice: Subject to any disclaimer, the term of this patent is extended or adjusted under 35 U.S.C. 154(b) by 813 days.

(21) Appl. No.: 17/950,947

(22) Filed: Sep. 22, 2022

(65) Prior Publication Data

US 2023/0101524 A1 Mar. 30, 2023

(30) Foreign Application Priority Data

Sep. 28, 2021 (IN) ............................ 202121044025

(51) Int. Cl.
*C01B 32/33* (2017.01)
*C10G 63/04* (2006.01)

(52) U.S. Cl.
CPC .............. *C01B 32/33* (2017.08); *C10G 63/04* (2013.01); *C01P 2002/72* (2013.01);
(Continued)

(58) Field of Classification Search
CPC .. C01B 32/33; C10G 63/04; C10G 2300/202; C10G 2300/205; C10G 2300/308; C10G 2400/06; C01P 2002/72
See application file for complete search history.

(56) References Cited

U.S. PATENT DOCUMENTS

| | | | | | |
|---|---|---|---|---|---|
| 3,966,560 | A * | 6/1976 | Farago | .................... | C10B 49/04 432/24 |
| 4,251,323 | A * | 2/1981 | Smith | ........................ | C10L 9/08 201/37 |

(Continued)

FOREIGN PATENT DOCUMENTS

| | | | | |
|---|---|---|---|---|
| EP | 0087968 A2 * | 9/1983 | ............. | C10B 55/00 |
| GB | 2134920 A * | 8/1984 | ............. | C10G 33/00 |
| WO | 2012162008 A1 | 11/2012 | | |

OTHER PUBLICATIONS

John M. Hunt. Petroleum Geochemistry and Geology, San Francisco: W.H. Freeman, 1979. p. 45 (Year: 1979).*

(Continued)

*Primary Examiner* — Paul A Wartalowicz
*Assistant Examiner* — Nicholas A. Piro

(57) ABSTRACT

The present invention provides a method for production of anode grade coke by processing crude oil feed stock in a DCU. The method comprising separation of low boiling light molecular weight components from heavier molecules and processing the same in Delayed Coker Unit after mixing with aromatic rich stream to overcome the operational issue envisaged due to processing of paraffin containing crude feed. The coke so obtained was calcined to produce an improved quality coke having lesser impurities (Sulfur <3 wt %) and better crystallinity.

8 Claims, 1 Drawing Sheet

(52) U.S. Cl.
CPC . *C10G 2300/202* (2013.01); *C10G 2300/205* (2013.01); *C10G 2300/308* (2013.01); *C10G 2400/06* (2013.01)

(56) References Cited

U.S. PATENT DOCUMENTS

| | | | | | |
|---|---|---|---|---|---|
| 4,919,792 | A * | 4/1990 | Huh | C10G 55/02 208/182 |
| 5,350,503 | A * | 9/1994 | Freymeyer | C10B 57/045 208/50 |
| 6,332,975 | B1 | 12/2001 | Abdel-Halim et al. | |
| 10,351,778 | B2 | 7/2019 | Iqbul | |
| 2019/0225892 | A1 * | 7/2019 | Pradeep | C10B 57/045 |

OTHER PUBLICATIONS

V. Suguruman et al. “Molecular-Level Characterization of Refinery Streams by High-Resolution Mass Spectrometry.” Energy & Fuels 2015, 29 (5), 2940-2950. (Year: 2015).*

Slurry Oil, Safety Data Sheet. Delek US. [Retrieved on Jun. 13, 2025]. Retrieved from the Internet: < URL: https://s204.q4cdn.com/601669363/files/doc_downloads/sdss/Slurry_Oil_SDS_NA2015_101322_FINAL-1.pdf> (Year: 2022).*

P. J. Ellis and C. A. Paul “Tutorial: Delayed Coking Fundamentals”, Great Lakes Carbon Corporation, presented at the AlChE 1998 Spring National Meeting, Mar. 1998. Retrieved from <URL: http://coking.com/wp-content/uploads/sites/2/2013/11/DelayedCokingFundamentals.pdf>. Archived [Sep. 12, 2014]. (Year: 1998).*

* cited by examiner

METHOD FOR PRODUCING ANODE GRADE COKE FROM CRUDE OILS

FIELD OF THE INVENTION

The present invention relates to the field of refining and more particularly to a method for production of anode grade coke in comparison to fuel grade pet coke directly from crude oils by employing a processing methodology different than a Delayed Coker Unit (DCU).

BACKGROUND OF THE INVENTION

Crude oil is a complex mixture of thousands of chemical species, most of which are hydrocarbons, i.e., they are made of carbon and hydrogen. Some chemical species in crude oil contain other elements (referred to as "hetero elements"), such as sulfur, nitrogen, or metals such as vanadium or nickel. Crude oils from different locations on the earth have vastly different composition; the types and relative amounts of compounds they contain can vary greatly. For example, "heavy" crude oils contain a relatively higher amount of large hydrocarbon molecules whereas "light" crude oil contains a relatively higher amount of small hydrocarbon molecules. "Sweet" crude oil contains little sulfur (typically less than about 0.5 weight percent) whereas "sour" crude oil contains a higher amount of sulfur (typically 1-2 weight percent or more).

Petroleum residues are the remaining fraction left after the distillation of crude oil in Atmospheric Distillation Unit (ADU) and Vacuum Distillation Unit (VDU). Residue fraction obtained from the bottom of ADU which is also called Reduced Crude Oil (RCO) is further fractionated in a VDU. Residue fraction obtained from VDU is a heavy asphaltene containing fraction with high sulfur, high metals, high nitrogen and this feed stock is called Vacuum Residue (VR) which is processed in a thermal cracking unit of a refinery. This thermal cracking process commonly used to treat petroleum residue is termed as Delayed coking. In this process, the petroleum residue is heated and subjected to thermal cracking to produce valuable lower-boiling petroleum distillate products, and a solid carbonaceous residue known as coke. Coke with a high sulfur and/or metal content is generally subject to combustion as a fuel. "Fuel grade coke" is generally not suitable for other purposes.

Petroleum coke (also referred to as pet coke and referred to herein simply as coke) is a high carbon product produced as a result of thermal cracking of heavy residue feed stock in DCU. The marketability of coke depends on the amount of impurities such as sulfur, metals, nitrogen etc, and its crystalline structure. Coke with a relatively high sulfur content is referred to as fuel grade coke and is sold as fuel for coal-burning boilers, typically for power generation. Sulfur content in fuel grade coke is in the range of 6-8 wt %. Anode grade coke is a type of coke obtained from a DCU which has a relatively low impurity content and better crystalline structure than fuel grade coke and is used to make electrodes for production of aluminum.

U.S. Ser. No. 10/351,778 B2 describes methods and systems for producing anode grade coke from crude oil having a high sulfur content. Crude oil was subjected to atmospheric distillation and the residue generated thereof further divided into different parts. One part is subjected to hydrotreatment while another is subjected to solvent deasphalting. Synthetic stream generated by blending of hydrotreated resid stream and one or more streams from SDA were used for production of anode grade coke. The configuration proposed in this prior art is complex and may not be cost effective as hydrotreatment of residue is expected to have a very high hydrogen requirement.

WO 2012/162008A1 describes different embodiments of process for delayed coking of whole crude oil stream. The fresh whole crude feed stream is mixed with bottom stream of coker fractionator and heated to temperature of 480° C. to 530° C. in the Coker furnace. Thereafter, the outlet stream from coker furnace is routed to the coke drums for coking. The coke drum effluent vapors are subjected to flash separation from which a light product gas stream and heavy boiling stream is separated. This heavy boiling stream is routed to the main fractionator with heavy gas oil recycle.

U.S. Pat. No. 6,332,975 B1 describes a method of deasphalting a residue stream into resin and asphaltene fractions and producing anode grade coke by coking the resin fraction generated thereof after hydrotreatment. It describes hydrotreating of (1) a minor portion of the residue feedstock wherein the hydrotreated residue is fed to the delayed coker with the resin-containing stream, (2) the resin-containing stream wherein the hydrotreated resin-containing stream is fed to the delayed coker, or (3) a major portion of the residue feedstock wherein the hydrotreated residue is fed to the solvent deasphalting unit.

There is a requirement for developing alternative, improved methods for production of anode-grade coke. This invention discusses the production of improved quality anode grade coke using crude oils. This invention also discusses mixing of aromatic rich stream with crude oil overcoming the operational issue envisaged due to processing of paraffin containing crude feed along with improvement in coke quality.

OBJECTIVES OF THE PRESENT INVENTION

It is a primary objective of the present invention to provide a method for production of coke with low impurity content directly from crude oils.

It is the further objective of the present invention to provide a method for production of anode grade coke in a Delayed Coker Unit (DCU).

It is the further objective of the present invention to provide a method to overcome the operational constraints of a DCU operation due to processing of crude oil.

It is further objective of the present invention to provide lower coke yield with an enhanced quality coke meeting anode grade coke specification.

It is the further objective of the present invention to maximize the recovery of lighter boiling fractions while producing Anode grade coke.

SUMMARY OF THE INVENTION

The present invention discloses a method for production of anode grade coke directly from crude oils in a DCU. In one of the aspects the present invention, provides a method for production of anode grade coke in a DCU, the method comprising:

i. charging the hydrocarbon feedstock (1; 32) to a desalter unit (2; 33) to obtain a desalted crude oil stream (3; 34);
ii. routing the desalted stream (3; 34) to a pre-separator vessel (4; 35) to obtain a lighter stream (5; 36) having a boiling point <300° C. and heavier stream fraction having a boiling point >300° C.;
iii. routing aromatic rich stream such as CLO (6) to the bottom of Pre-separator vessel (4) for separation of 300° C.− fraction from CLO and mixing with the 300° C.+ fraction of crude oil to form a heavier stream iv. routing the heavier stream fraction to the furnace (8; 39);

v. feeding the heated effluent stream (9; 40) from the furnace (8; 39) to coke drums (12/13; 43/44) for cracking into lighter hydrocarbons and coke;

vi. routing coke drum effluent (16; 47) to a main fractionator (17; 49) to obtain lightcoker gas oil, heavy coker gas oil, fuel oil;

vii. mixing gaseous product stream (18; 50) from main fractionator (17; 49) with the lighter stream (5; 36) having boiling point <300° C.;

viii. conveying raw petroleum coke (25;57) obtained from coke drum to feed silo (26; 58) and obtaining a feed stream for calcination (27; 59); and ix. calcining the raw petroleum coke feed (27; 59) in a-kiln (28;60) and routing the calcined coke (29; 61) to cooler (30;62) to obtain anode grade coke (31; 63).

In one of the aspects the present invention, provides a method for production of anode grade coke in a DCU, the method comprising:

i. charging the hydrocarbon feedstock (1; 32) to a desalter unit (2; 33) to obtain a desalted crude oil stream (3; 34);

ii. routing the desalted stream (3; 34) to a pre-separator vessel (4; 35) to obtain a lighter stream (5; 36) having a boiling point <300° C. and heavier stream fraction having a boiling point >300° C.;

iii. routing aromatic rich stream such as CLO (48) to the Main fractionator of DCU (49) as wash oil wherein; lighter fraction of CLO is separated and heavier fraction washes the coke drum effluent vapors to generate a recycle stream (38) which is mixed with the heavier stream (37) from Pre-separator vessel (35)

iv. routing the heavier stream fraction to the furnace (8; 39);

v. feeding the heated effluent stream (9; 40) from the furnace (8; 39) to coke drums (12/13; 43/44) for cracking into lighter hydrocarbons and coke;

vi. routing coke drum effluent (16; 47) to a main fractionator (17; 49) to obtain light coker gas oil, heavy coker gas oil, fuel oil;

vii. mixing gaseous product stream (18; 50) from main fractionator (17; 49) with the lighter stream (5; 36) having boiling point <300° C.;

viii. conveying raw petroleum coke (25;57) obtained from coke drum to feed silo (26; 58) and obtaining a feed stream for calcination (27; 59); and ix. calcining the raw petroleum coke feed (27; 59) in a-kiln (28;60) and routing the calcined coke (29; 61) to cooler (30;62) to obtain anode grade coke (31; 63).

In another aspect of the present invention, the hydrocarbon feedstock (1; 32) is selected from the group consisting of different crude oils, sour crude oil, sweet crude oils, opportunity crudes and heavier streams generated thereof.

In another aspect of the present invention, the coke drums (12, 13; 43, 44) are operated at an overhead temperature of 430-460° C., and a pressure of 1-5 Kg/cm$^2$ (g), and the temperature of heated effluent stream (9; 40) from furnace (8;39) is in the range of 480-510° C.

In one of the preferred aspects, the heavier stream fraction having a boiling point >300° C. in step (ii) is mixed with an aromatic rich stream (6), routed through the bottom of pre-separator vessel.

In another aspect of the present invention, the aromatic rich stream (6) is selected from the group consisting of pyrolysis tar, aromatic tar, clarified light oil.

In another aspect of the present invention, the heavier stream fraction having a boiling point >300° C. obtained from step (ii) is mixed with a recycle stream (38), before routing to the furnace (39).

In another aspect of the present invention, the Coke drum effluent (47) in the main fractionator (49) is washed by an aromatic rich stream (48), to condense heavier molecules from coke drum product vapor effluent (47) and to produce recycle stream (38), and the aromatic rich stream (48) is selected from the group consisting of pyrolysis tar, aromatic tar, clarified light oil.

In one of the preferred aspects of the present invention, the sulfur and nitrogen content of coke produced are ≤3 wt and 0.1. %, respectively and coke meets anode grade coke quality.

In one of the aspects of the present invention, the method comprising:

i. charging the hydrocarbon feedstocks (1) to a desalter unit (2) to obtain a desalted stream (3);

ii. routing the desalted stream (3) to a pre-separator vessel (4) to obtain a lighter stream (5) having boiling point <300° C. and a heavier stream fraction having a boiling point >300° C.;

iii. routing aromatic rich Clarified Light Oil (CLO) stream (6) to the bottom of pre-separator vessel (4) for separation of 300° C.− fraction from CLO and mixes with heavier stream fraction;

iv. routing the mixed feed stream fraction (7) consisting heavier stream fraction from Crude oil and CLO stream (6) to the furnace (8) for heating to cracking temperature;

v. feeding the heated effluent stream (9) from the furnace (8) to coke drums (12/13) for cracking into lighter hydrocarbons and coke;

vi. routing coke drum effluent (16) to a main fractionator (17) to obtain light coker gas oil (20), heavy coker gas oil (21), fuel oil (22);

vii. mixing gaseous stream (18) from main fractionator (17) with the lighter stream (5) having boiling point <300° C.;

viii. routing raw petroleum coke (25) obtained from coke drum to feed silo (26), and obtaining a feed stream (27) for calcination; and ix. calcining the raw petroleum coke feed (27) in a kiln (28) and routing the calcined coke (29) to a cooler (30) to obtain anode grade quality coke (31).

In still another aspect of the present invention, the method comprising:

i. charging the hydrocarbon feedstocks (32) to a desalter unit (33) to obtain a desalted stream (34);

ii. routing the desalted stream (34) to a pre-separator vessel (35) to obtain lighter stream (36) having boiling point <300° C. and a heavier stream fraction having a boiling point >300° C.;

iii. adding recycled stream (38) to the heavy stream fraction (37) and routing the to the furnace (39) for heating to cracking temperature;

iv. feeding the heated effluent stream (40) from the furnace (39) to coke drums (43/44) for cracking into lighter hydrocarbons and coke;

v. routing coke drum effluent (47) which is washed by an aromatic rich stream (48) in a main fractionator (49) to obtain light coker gas oil (52), heavy coker gas oil (53), fuel oil (54) and condense heavier molecules to produce recycle stream (38);

vi. mixing gaseous stream (50) from main fractionator (49) with the lighter stream (36) having boiling point <300° C.; and vii. routing raw petroleum coke (57) obtained from coke drum to feed silo (58), and obtaining a feed stream (59) for calcination;

viii. calcining the raw petroleum coke (59) in a-kiln (60) and routing the calcined coke (61) to a cooler (62) to obtain anode grade coke (63).

DETAILED DESCRIPTION OF THE INVENTION

Figure 1:
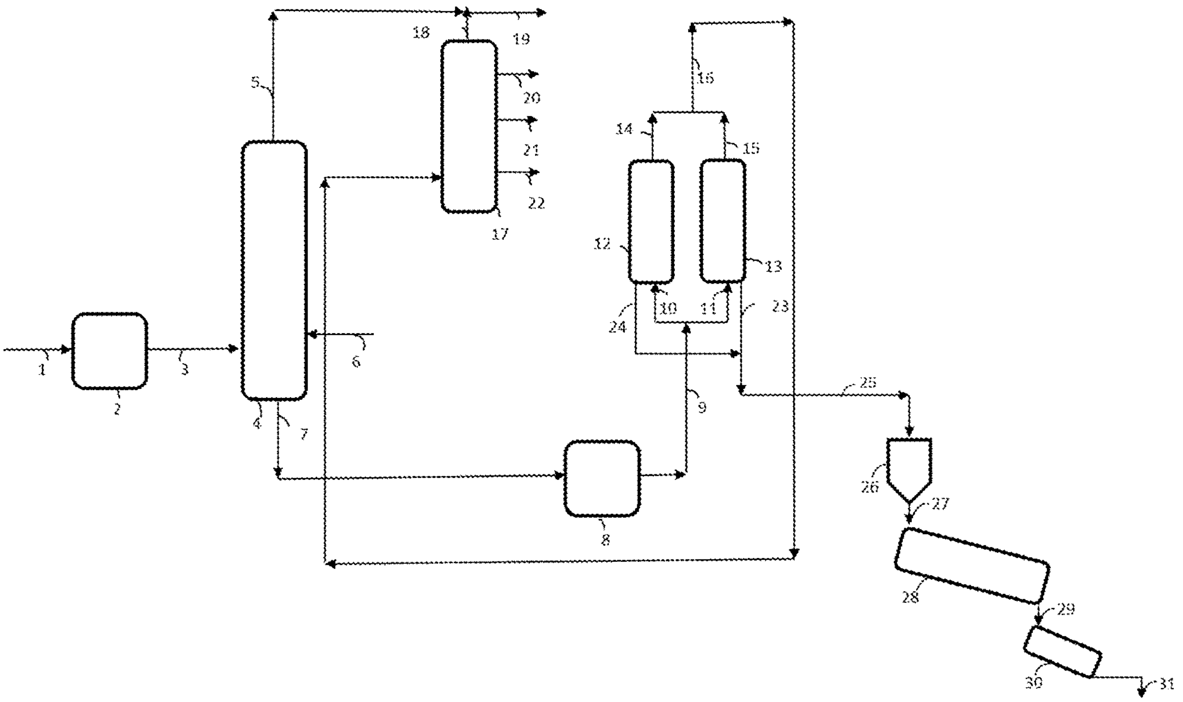
FIG. 1: illustrates embodiment 1 of the present invention.

For promoting an understanding of the principles of the present disclosure, reference will now be made to the specific embodiments of the present invention further illustrated in the drawings and specific language will be used to describe the same. The foregoing general description and the following detailed description are explanatory of the present disclosure and are not intended to be restrictive thereof. It will nevertheless be understood that no limitation of the scope of the present disclosure is thereby intended, such alterations and further modifications in the illustrated method, and such further applications of the principles of the present disclosure as illustrated herein being contemplated as would normally occur to one skilled in the art to which the present disclosure relates. Unless otherwise defined, all technical and scientific terms used herein have the same meaning as commonly understood by one of ordinarily skilled in the art to which this present disclosure belongs. The methods, and examples provided herein are illustrative only and not intended to be limiting.

Anode grade coke is a type of coke product obtained from a Delayed Coker Unit having a sponge like structure with relatively low levels of sulfur and impurities such as metals, Nitrogen etc.

Feed Stock:

Feed stocks in the present invention are selected from sour/sweet crude oils, opportunity crudes. Aromatic oils are selected from oils such as clarified light oils, aromatic tars, pyrolysis tars.

The main embodiment of the present invention provides a method for production of anode grade coke by processing crude oil in a Delayed Coker Unit (DCU), the method comprising:

i. charging the hydrocarbon feedstocks to a desalter unit to obtain a desalted crude oil;

ii. routing the desalted stream oil to a pre-separator vessel to obtain lighter stream having boiling point <300° C. and heavier stream fraction having a boiling point >300° C.;

iii. aromatic rich stream is routed to the bottom of pre-separator vessel and mixes with heavier stream fraction and lighter fraction of aromatic rich stream is recovered in the pre-separator along with <300° C. boiling stream of crude oil;

iv. routing the mixed feed stream fraction to the furnace for heating to cracking temperature;

v. feeding the heated stream from furnace to coke drum(s) for cracking into lighter hydrocarbons and coke;

vi. routing coke drum effluent to main fractionator to obtain lighter coker gas oil, heavy coker gas oil, fuel oil;

vii. mixing gaseous product stream from main fractionator with lighter stream having boiling point <300° C.; and viii. routing raw petroleum coke obtained from coke drum to feed silo, raw coke from feed silo outlet is calcined in a-kiln and routed to cooler to obtain anode grade coke.

In another embodiment of the present invention, the crude oil feed stream is separated in a 'Pre-separator vessel' to obtain lighter components (300° C.−) from the heavier molecules of crude oil containing 300° C.+ fraction.

In another preferred embodiment of the present invention provides a method to overcome the operational constraints of a DCU operation due to processing of crude oil. The heavy streams (300° C.+) are mixed with an aromatic rich stream such as pyrolysis tar, aromatic tar, Clarified Light Oil (CLO) etc. and routed to the Coker furnace and Coke drums subsequently.

In another embodiment of the present invention, hydrocarbon feed stock used in the process are different crude oils; sour and sweet, opportunity crudes and heavier streams generated thereof etc.

Process Conditions:

The process described herein have been carried out by maintaining the Furnace Coil Outlet Temperature in the range of 480-510° C. and the coke drum overhead temperature in the range of 430-460° C. The operating pressure maintained in the process is in the range of 1-5 Kg/cm$^2$ (g).

Embodiment I

A schematic process flow diagram of one of the aspect of the present invention is depicted in FIG. 1, wherein part or whole of the Crude oil feedstock (1) is desalted in a desalter unit (2) to obtain desalted stream (3). The desalted stream (3) is thereafter routed to a Pre-Separator Vessel (4) to separate out stream (5) having boiling range less than 300° C. from the feed stream (3). An aromatic rich Clarified Light Oil (CLO) stream (6) is routed to the bottom of the Pre-separator vessel (4). The lighter boiling valuable fraction (300° C.−) of this CLO gets separated in pre fractionator and the fraction boiling above 300° C. mixes with 300° C.+ boiling range material of (3) and mixed feed stream (7) is obtained. The mixed feed stream (7) is fed to the furnace (8) of Delayed Coking Unit. Heated effluent stream (9) from furnace (8) is routed to either of Coke Drums (12) or (13) whichever is in filling cycle through (10) or (11). The mixed feed cracks to lighter hydrocarbons and coke inside the Coke drums. Coke drum effluent (16) is thereafter routed to the Main fractionator (17). Product streams from (17) such as gases (18) after mixing with (5) are sent for further processing. Distillate fractions light coker gas oil (20), heavy coker gas oil (21) and fuel oil (22) are sent for downstream processing. The coke (25) obtained from coke drums is sent to a feed silo (26). Thereafter, raw coke (27) from silo outlet is calcined in a kiln (28) of a calciner unit. Calcined coke (29) from kiln (28) is sent to a cooler (30) and calcined coke product (31) meeting anode grade coke specification is obtained.

Embodiment II

Figure 2:
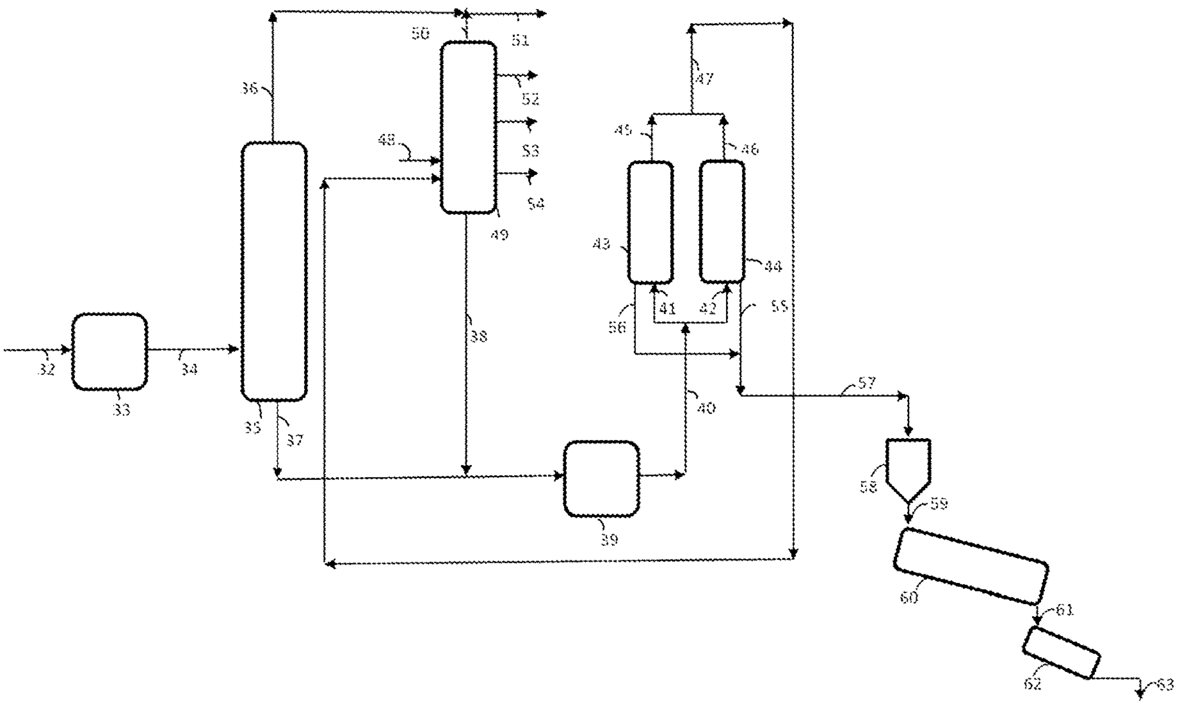
FIG. 2: illustrates embodiment 2 of the present invention.

Another schematic process flow diagram of the present invention as depicted FIG. 2, part or whole of the Crude oil feedstock (32) is desalted in a desalter unit (33) to obtain desalted stream (34). The desalted stream (34) is thereafter routed to a Pre-Separator Vessel (35) to separate stream (36) having boiling range less than 300° C. from the feed stream (34). The 300+ boiling range stream (37) is mixed with recycle stream (38) and routed to the furnace (39) of Delayed Coking Unit. Heated effluent stream (40) from furnace (39) is routed to either of Coke Drums (43) or (44) whichever is in filling cycle through line (41) or (42). The mixed feed cracks to lighter hydrocarbons and coke inside the Coke drums. Coke drum effluent (47) is thereafter routed to the Main fractionator (49). Aromatic oil such as Clarified Light Oil stream (48) is routed to the bottom of Main fractionator (49) where it condenses heavier molecules from coke drum effluent (47) to produce recycle stream (38). Product streams from (49) such as gases (50) after mixing with (36) are sent for further processing. Distillate fractions light coker gas oil (52), heavy coker gas oil (53) and fuel oil (54) are sent for downstream processing. The coke (57) obtained from coke drums is sent to a feed silo (58). Thereafter, raw coke (59) from feed silo outlet is calcined in a kiln (60) of a calciner unit. Calcined coke from (61) is sent to a cooler (62) and calcined coke product (63) meeting anode grade coke specification is obtained.

Processing of 300+ fraction of crude oil and mixing of aromatic rich stream enhances the coke quality in comparison to that obtained from Vacuum residue feed stock.

Examples

Example 1: Crude Blend A with property provided in Table-1 was subjected to thermal cracking as per process conditions provided in Table-2 in a lab scale thermal cracker unit to obtain Raw Petroleum Coke A (RPC A). RPC obtained from the experiment was subjected to calcination in a batch calcination unit at conditions provided in Table-3 to obtain Calcined Petroleum Coke A (CPC A). CPC properties are provided in Table-4.

TABLE 1

| Crude A property | | |
|---|---|---|
| S. N | Property of Crude A | Value |
| 1. | Density, g/cc | 0.8908 |
| 2. | CCR, wt % | 8.21 |
| 3. | SimDist 5/10/30/50/70/90/95 | 165/210/285/358/458/582/786 |
| 4. | Sulfur, wt % | 3 |
| 5. | Nitrogen, wt % | 0.13 |
| 6. | Metals, ppmw Ca/Fe/Mg/Na/Ni/V | <1/2/<1/8/16/26 |

TABLE 2

| Operating Condition and Coke yield | | |
|---|---|---|
| S. N | Parameter | Value |
| 1. | Operating temperature, ° C. | 486 |
| 2. | Pressure, $Kg/cm^2$ (g) | 1.8 |
| 3. | Coke yield (Crude A), wt % | 12.6 |

TABLE 3

| Calcination condition | | |
|---|---|---|
| S. No. | Parameter | Value |
| 1. | Temperature, ° C. | 1250 |
| 2. | Residence time, hrs | 4 |

TABLE 4

| Property of Crude A derived coke | | | | |
|---|---|---|---|---|
| S N | Parameter | RPC A | CPC A | Anode grade coke spec |
| 1. | Sulfur, wt % | 5 | 2.5 | 2.5-3 (max.) |
| 2. | Nitrogen, wt % | 0.4 | <0.1 | — |
| 3. | Moisture, wt % | <1 | 0.22 | 0.3 (max.) |
| 4. | Ash, wt % | 0.1 | 0.32 | 0.35 (max.) |
| 5. | VMC, wt % | 8.9 | 0.46 | 0.5 (max.) |
| 6. | Fixed Carbon, wt % | 90.7 | 99.04 | 99 |
| 7. | Real Density, g/cc | — | 2.06 | 2.05-2.085 |
| | Metal content, ppm | | | |
| 8. | Ni | 127 | 152 | 200 (max.) |
| 9. | V | 207 | 247 | 250 (max.) |
| 10. | Ni + V | 334 | 399 | 350-450 (max.) |
| 11. | Na | 64 | 159 | 100-300 (max.) |
| 12. | Ca | 8 | 16 | 100-200 (max.) |
| 13. | Na + Ca | 72 | 175 | 200 (max.) |
| 14. | Fe | 16 | 18 | 200-600 (max.) |

Coke as described in Table 4 was subjected to XRD analysis for measurement of Crystallite Size (Lc). Lc value was observed to be 37 Å, indicating a good quality crystalline structure. It can be observed that all properties of crude derived CPC A fall in the range of anode grade coke.

Example 2: Crude A described in Table-1 was subjected to Atmospheric Distillation followed by Vacuum Distillation to generate Vacuum Residue (VR) which is a typical Coker feed stock (Table-5). VR was subjected to thermal cracking in a thermal cracker unit as per process conditions described in Table-6 to obtain Raw Petroleum Coke B (RPC B). RPC B thus obtained was subjected to calcination in a batch scale calcination unit as per conditions in Table-7 to generate Calcined Petroleum Coke B (CPC B). Property of coke thus obtained is provided in Table-8

TABLE 5

| Property of Vacuum Residue feed stock from crude A | | |
|---|---|---|
| S. N | Property | Value |
| 1. | Density, g/cc | 1.0551 |
| 2. | CCR, wt % | 28 |
| 3. | SimDist 5/10/30/50/70/90/95 | 564/581/624/670/729/823/973 |
| 4. | Sulfur, wt % | 6 |
| 5. | Nitrogen, wt % | 0.4 |
| 6. | Metals, ppmw Ca/Fe/Mg/Na/Ni/V | 1/10/<1/49/57/170 |

TABLE 6

Operating Condition and Coke yield

| S. N | Parameter | Value |
|---|---|---|
| 1. | Operating temperature, ° C. | 486 |
| 2. | Pressure, Kg/cm$^2$ (g) | 1.8 |
| 3. | Coke yield (VR), wt % | 30 |

TABLE 7

Calcination condition

| S. No. | Parameter | Value |
|---|---|---|
| 1. | Temperature, ° C. | 1250 |
| 2. | Residence time, hrs | 4 |

TABLE 8

Coke generated from VR of Crude A

| S N | Parameter | RPC B | CPC B | Anode grade coke spec |
|---|---|---|---|---|
| 1. | Sulfur, wt % | 8 | 3.4 | 2.5-3 (max.) |
| 2. | Nitrogen, wt % | 1.4 | 0.9 | — |
| 3. | Moisture, wt % | <1 | 0.22 | 0.3 (max.) |
| 4. | Ash, wt % | 0.12 | 0.4 | 0.35 (max.) |
| 5. | VMC, wt % | 9.38 | 3.95 | 0.5 (max.) |
| 6. | Fixed Carbon, wt % | 90.19 | 95.47 | 99 |
| 7. | Real Density, g/cc | — | 2.05 | 2.06-2.08 |
| | Metal content, ppm | | | |
| 8. | Ni | 190 | 254 | 200 (max.) |
| 9. | V | 567 | 769 | 250 (max.) |
| 10. | Ni + V | 757 | 1023 | 350-450 (max.) |
| 11. | Na | 163 | 320 | 100-300 (max.) |
| 12. | Ca | 4 | 7 | 100-200 (max.) |
| 13. | Na + Ca | 167 | 327 | 200 (max.) |
| 14. | Fe | 33 | 38 | 200-600 (max.) |

CPC B as described in Example-2 was subjected to XRD analysis for measurement of Crystallite size (Lc). Lc was observed to be 34.7 Å which is lower than that of CPC A, indicating a lesser evolved crystalline structure. Also, metals such as Vanadium, Nickel and Sodium were concentrated in coke leading to poor quality of coke. Impurities such as sulphur and Nitrogen content were also found to be high in RPC & CPC B generated from VR.

Example 3: In another experiment, aromatic stream of Clarified Light Oil (CLO) having property as provided in Table-9 was mixed with crude oil feed stock in a ratio of 10:90 and processed in a laboratory scale thermal cracking unit as per process conditions mentioned in Table-10 to obtain Raw Petroleum Coke C (RPC C). RPC C generated thereof was subjected to calcination as per conditions provided in Table-11 to obtain Calcined Petroleum Coke C (CPC C). Calcined coke obtained had property provided in Table-12.

TABLE 9

Property of CLO

| S. N | Property | Value |
|---|---|---|
| 1. | Density, g/cc | 1.1 |
| 2. | CCR, wt % | 15.9 |
| 3. | SimDist 5/10/30/50/70/90/95 | 219/320/360/386/422/478/524 |
| 4. | Sulfur, wt % | 0.4 |
| 5. | Nitrogen, wt % | 0.04 |
| 6. | Metals, ppmw Ca/Fe/Mg/Na/Ni/V | <1/<1/<1/<1/<1/<1 |

TABLE 10

Operating condition

| S. N | Parameter | Value |
|---|---|---|
| 1. | Operating temperature, ° C. | 486 |
| 2. | Pressure, Kg/cm$^2$ (g) | 1.8 |
| 3. | Coke yield, wt % | 20 |

TABLE 11

Calcination condition

| S. No. | Parameter | Value |
|---|---|---|
| 1. | Temperature, ° C. | 1250 |
| 2. | Residence time, hrs | 4 |

TABLE 12

Coke generated from Crude A and CLO

| S N | Parameter | RPC C | CPC C | Anode grade coke spec |
|---|---|---|---|---|
| 1. | Sulfur, wt % | 4.7 | 2.3 | 2.5-3 (max.) |
| 2. | Nitrogen, wt % | 0.39 | <1 | — |
| 2. | Moisture, wt % | 0.51 | 0.08 | 0.3 (max.) |
| 3. | Ash, wt % | 0.12 | 0.38 | 0.35 (max.) |
| 4. | VMC, wt % | 3.74 | 0.48 | 0.5 (max.) |
| 5. | Fixed Carbon, wt % | 95.63 | 99.06 | 99 |
| 6. | Real Density, g/cc | — | 2.07 | 2.06-2.08 |
| | Metal content, ppm | | | |
| 8. | Ni | 116 | 138 | 200 (max.) |
| 9. | V | 187 | 223 | 250 (max.) |
| 10. | Ni + V | 303 | 361 | 350-450 (max.) |
| 11. | Na | 65 | 163 | 100-300 (max.) |
| 12. | Ca | 18 | 36 | 100-200 (max.) |
| 13. | Na + Ca | 83 | 199 | 200 (max.) |
| 14. | Fe | 42 | 48 | 200-600 (max.) |

Calcined coke as described in Example-3 was subjected to XRD analysis for measurement of Crystallite size (Lc). Lc was observed to be ~38 Å indicating an improvement in coke quality.

Advantages of the Present Invention

1. No hydrogen requirement as it does not involve hydrotreatment of residues.
2. Solvent deasphalting of residues is not required and therefore more economical as there is no additional cost with respect to solvents involved.
3. Current invention is easy to implement with existing as well as grass root units.
4. Separation of lighter fraction (300° C.–) of CLO in the pre-separator thereby recovering valuable lighter boiling fractions while producing Anode grade coke 5. Production of superior quality coke meeting anode grade specification

We claim:

1. A method for production of anode grade coke in a delayed coker unit (DCU), the method consisting of:

i. charging sour crude oil to a desalter unit to obtain a desalted stream, wherein the sour crude oil has a sulfur content of 3 wt. %, nitrogen content of 0.13 wt. %, and Conradson Carbon Residue (CCR) of 8.21 wt. %;

ii. routing the desalted stream to a pre-separator vessel to fractionate the desalted stream to obtain a lighter stream having a boiling point <300° C., and a heavier stream fraction having a boiling point >300° C.;

iii. adding an aromatic stream to a bottom of the pre-separator vessel to fractionate the aromatic stream within the pre-separator vessel for separating lighter boiling valuable fraction (300° C.−), and a heavier boiling fraction (300° C.+), wherein the aromatic stream is selected from the group consisting of a pyrolysis tar, an aromatic tar, and a clarified light oil, wherein the clarified light oil (CLO) is a hydrocarbon having a density of 1.1 g/cc, a CCR of 15.9 wt %, sulfur content of 0.4 wt %, nitrogen content of 0.04 wt % and <1 ppmw of metal impurities;

iv. mixing the lighter boiling valuable fraction from the aromatic stream with the lighter stream of the crude oil having a boiling point <300° C., and mixing the heavier boiling fraction from the aromatic stream with the heavier stream fraction of the crude oil having a boiling point >300° C. in the pre-separator vessel to form a mixed feed stream;

v. routing the mixed feed stream from the pre-separator vessel directly to a furnace to obtain a heated effluent stream;

vi. feeding the heated effluent stream from the furnace to a coke drum for cracking into coke, and to generate a coke drum effluent;

vii. routing the coke drum effluent to a main fractionator to obtain a light coker gas oil, a heavy coker gas oil, and a fuel oil, thereby preventing intermixing of coke drum effluent with the sour crude oil or fractions of sour crude oil and the aromatic stream;

viii. mixing a gaseous product stream from the main fractionator with the lighter stream having a boiling point <300° C. from the pre-separator vessel, and sending for processing;

ix. routing the coke obtained from the coke drum to a feed silo and obtaining raw coke; and x. calcining the raw coke in a kiln and routing the calcined coke to a cooler to obtain the anode grade coke with a crystallite size (Lc) of 38 Å.

2. The method as claimed in claim 1, wherein the coke drum is operated at an overhead temperature of 430° C.-460° C. and at a pressure of 1 $Kg/cm^2$-5 $Kg/cm^2$ gauge pressure.

3. The method as claimed in claim 1, wherein the heated effluent stream from the furnace has a temperature in a range of 480° C.-510° C.

4. The method as claimed in claim 1, wherein the anode grade coke has ≤3 wt. % of sulfur, and ≤0.1 wt. % of nitrogen.

5. A method for production of anode grade coke in a delayed coker unit (DCU), the method consisting of:

i. charging sour crude oil to a desalter unit to obtain a desalted stream;

ii. routing the desalted stream to a pre-separator vessel to obtain a lighter stream having boiling point <300° C. and a heavier stream fraction having a boiling point >300° C.;

iii. routing an aromatic stream to a bottom of a main fractionator wherein the aromatic stream condenses heavier molecules from a coke drum effluent to produce a recycle stream, wherein the aromatic stream is selected from the group consisting of pyrolysis tar, aromatic tar, and clarified light oil, wherein the clarified light oil (CLO) is a hydrocarbon having a density of 1.1 g/cc, a CCR of 15.9 wt %, sulfur content of 0.4 wt %, nitrogen content of 0.04 wt % and <1 ppmw of metal impurities;

iv. mixing the heavier stream fraction having the boiling point >300° C. with the recycle stream to produce a mixed feed stream and routing the mixed feed stream to a furnace to obtain a heated effluent stream;

v. feeding the heated effluent stream from the furnace to a coke drum for cracking into coke, and to obtain the coke drum effluent;

vi. routing the coke drum effluent to the main fractionator to obtain light coker gas oil, heavy coker gas oil, fuel oil, and a gaseous stream, thereby preventing intermixing of coke drum effluent with the sour crude oil or fractions of sour crude oil;

vii. mixing the gaseous stream from the main fractionator with the lighter stream having boiling point <300° C. from the pre-separator vessel, and sending for processing;

viii. routing the coke obtained from the coke drum to feed a silo, and obtaining raw coke; and ix. calcining the raw coke in a kiln and routing the calcined coke to a cooler to obtain the anode grade quality coke.

6. The method as claimed in claim 5, wherein the coke drum is operated at an overhead temperature of 430° C.-460° C., and at a pressure of 1 $Kg/cm^2$-5 $Kg/cm^2$ gauge pressure.

7. The method as claimed in claim 5, wherein the heated effluent stream from the furnace has a temperature in a range of 480° C.-510° C.

8. The method as claimed in claim 5, wherein the anode grade coke has ≤3 wt. % of sulfur and 0.1 wt. % of nitrogen.

* * * * *